United States Patent [19]

Lowery et al.

[11] Patent Number: 4,847,320

[45] Date of Patent: Jul. 11, 1989

[54] STABLE DISPERSIONS AND THE MANUFACTURE THEREOF

[75] Inventors: Michael K. Lowery, Pittsburgh; Richard E. Keegan, McMurray; Mark A. Koshute, Beaver, all of Pa.

[73] Assignee: Mobay Corporation, Pittsburgh, Pa.

[21] Appl. No.: 225,691

[22] Filed: Jul. 28, 1988

[51] Int. Cl.$^4$ ............................................. C08L 75/04
[52] U.S. Cl. .................................. 524/722; 524/724; 524/729; 524/762; 524/773; 525/424; 525/440; 525/452
[58] Field of Search ............... 524/722, 724, 729, 762, 524/773, 775; 525/424, 440, 452

[56] References Cited

U.S. PATENT DOCUMENTS

| | | | |
|---|---|---|---|
| 3,325,421 | 6/1967 | Muller | 252/308 |
| 4,092,275 | 5/1978 | Reischl et al. | 260/2.5 |
| 4,093,569 | 6/1978 | Reischl et al. | 260/2.5 |
| 4,119,613 | 10/1978 | Reischl et al. | 526/64 |
| 4,147,680 | 4/1979 | Reischl et al. | 260/29.2 |
| 4,184,990 | 1/1980 | Reischl et al. | 260/29.2 |
| 4,293,470 | 10/1981 | Cuscurida | 260/45.9 |
| 4,296,213 | 10/1981 | Cuscurida et al. | 521/166 |
| 4,305,857 | 12/1981 | Reischl | 260/29.2 |
| 4,305,858 | 12/1981 | Reischl | 260/29.2 |
| 4,310,448 | 1/1982 | Reischl | 260/29.6 |
| 4,310,449 | 1/1982 | Reischl | 260/29.6 |
| 4,324,716 | 4/1982 | Reischl et al. | 524/761 |
| 4,374,209 | 2/1983 | Rowlands | 521/116 |
| 4,496,678 | 1/1985 | Wenzel et al. | 524/157 |
| 4,523,025 | 6/1985 | Cuscurida et al. | 560/26 |

*Primary Examiner*—Maurice J. Welsh
*Attorney, Agent, or Firm*—Gene Harsh; Joseph C. Gil; Richard E. L. Henderson

[57] ABSTRACT

The present invention relates to a process for the production of stable dispersions of polyureas and/or polyhydrazodicarbonamides in a hydroxyl-group-containing material by reacting an organic di- or polyisocyanate with a composition selected from the group consisting of polyamines containing primary and/or secondary amine groups, hydrazines, hydrazides, and mixtures thereof, in said hydroxyl-group containing material, in the presence of a dispersion stabilizing compound.

9 Claims, No Drawings

STABLE DISPERSIONS AND THE MANUFACTURE THEREOF

BACKGROUND OF THE INVENTION

The present invention relates to a process for the production of stable dispersions of polyureas and/or polyhydrazodicarbonamides in a hydroxyl-group-containing material.

Dispersions of polyureas and/or polyhydrazodicarbonamides in organic compounds containing hydroxyl groups are known and are used extensively in the polyurethane products. See, e.g., U.S. Pat. Nos. 3,325,421, 4,092,275, 4,093,569, 4,119,613, 4,147,680, 4,184,990, 4,293,470, 4,296,213, 4,305,857, 4,305,858, 4,310,448, 4,310,449, 4,324,716, 4,374,209, 4,496,678, and 4,523,025. In the commercial production of such dispersions, any water present is generally reduced to a level below 0.5% by weight. Before removal of the water, such dispersions typically contain around 1.5% by weight of water. For many applications, such as the manufacture of polyurethane shoe soles, the water content must be as low as possible. For other applications, higher water contents are desirable. However, when water is added to the dispersions after their formation, the viscosity of the resultant product may increase with time. In some instances, the increase can be quite dramatic.

One solution to the above-noted problem can be found in U.S. Pat. No. 4,496,678. The present invention is directed to yet another solution to the problem. Dispersions of this type have a relatively stable viscosity with time even when additional water is present.

DESCRIPTION OF THE INVENTION

The present invention is more particularly directed to a process for the production of stable dispersions of polyureas and/or polyhydrazodicarbonamides in a hydroxyl-group-containing material selected from the group consisting of polyethers, polyesters, polyesteramides, polycarbonates and mixtures thereof. These dispersions are made by reacting (i) organic di- and/or polyisocyanates with (ii) a compound selected from the group consisting of polyamines containing primary and/or secondary amine groups, hydrazines, hydrazides, and mixtures thereof, in (iii) the hydroxyl-group-containing material. The reaction is conducted in the presence of a dispersion stabilizing compound. Although the mechanism of action for the dispersion stabilizing compounds of the present invention is not known, it has now been found that suitable dispersion stabilizing compounds include compounds that are also capable of catalyzing the reaction between isocyanate groups and amines or water; that is, the so-called urea-type catalysts or blowing catalysts of polyurethane chemistry. The dispersion stabilizing compound is used in an amount of at least 50 parts by weight per million parts by weight of the combined weight of components (i), (ii) and (iii). It is preferred that the reaction components be continuously introduced into a flow mixer in quantities such that the equivalent ratio of component (i) to component (ii) is from 0.8:1 to 1.35:1. The average residence time in the mixer is less than 10 minutes. The reaction product issuing from the flow mixer is subsequently collected in a receiver.

The stable dispersions of the present invention have solids contents (in the form of polyureas and/or polyhydrazodicarbonamides) of from 1 to 35% by weight.

It has been found that by using the dispersion stabilizing compound required in the present invention, the resultant dispersion has increased stability, particularly even when water is added.

The present invention is also directed to the stable dispersions themselves.

In preparing the dispersions of the invention, substantially any di- and/or polyisocyanate may be used. Suitable isocyanates include aliphatic, cycloaliphatic, araliphatic, aromatic and heterocyclic polyisocyanates of the type described, for example, by W. Siefken in *Justus Liebigs Annalen der Chemie*, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (see, e.g. German Auslegeschrift No. 1,202,785 and U.S. Pat. No. 3,401,190): 2,4- and 2,6-hexahydrotolylene diisocyanate and mixtures of these isomers; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenylmethane-2,4'- and/or -4,4'-diisocyanate; naphthylene-1,5-diisocyanate; triphenyl-methane-4,4',4''-triisocyanate; polyphenyl-polymethylene-polyisocyanates of the type which may be obtained by condensing aniline with formaldehyde, followed by phosgenation, and which are described, for example, in British Pat. Nos. 878,430 and 848,671; m- and p-isocyanatophenyl sulfonyl isocyanates of the type described in U.S. Pat. No. 3,454,606; perchlorinated aryl polyisocyanates of the type described, for example, in U.S. Pat. No. 3,227,138; polyisocyanates containing carbodiimide groups of the type described in U.S. Pat. No. 3,152,162: diisocyanates of the type described in U.S. Pat. No. 3,492,330; polyisocyanates containing allophanate groups of the type described, for example, in British Pat. No. 994,890, Belgian Pat. No. 761,616 and published Dutch Patent Application No. 7,102,524: polyisocyanates containing isocyanurate groups of the type described, for example, in U.S. Pat. No. 3,002,973, in German Pat. Nos. 1,022,789, 1,222,067 and 1,027,394, and in German Offenlegungsschriften Nos. 1,919,034 and 2,004,048; polyisocyanates containing urea groups of the type described in German Pat. No. 1,230,778; polyisocyanates containing biuret groups of the type described, for example, in German Pat. No. 1,101,394, U.S. Pat. Nos. 3,124,605 and 3,201,372, and in British Pat. No. 889,050; polyisocyanates obtained by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763, and in German Pat. No. 1,231,688; reaction products of the above-mentioned isocyanates with acetals as described in German Pat. No. 1,072,385; and polyisocyanates containing polymeric fatty acid radicals of the type described in U.S. Pat. No. 3,455,883. It is also possible to use the isocyanate-group-containing distillation residues accumulating in the production of isocyanates on a commercial scale, optionally in solution in one or more of the aformentioned polyisocyanates. It is also possible to use mixtures of the aforementioned polyisocyanates.

In general, it is particularly preferred to use readily available polyisocyanates, such as 2,4- and 2,6-tolylene diisocyanates and mixtures of these isomers ("TDI"); polyphenyl-polymethylene-polyisocyanates of the type obtained by condensing aniline with formaldehyde, followed by phosgenation ("crude MDI") and polyisocyanates containing carbodiimide groups, allophanate groups, isocyanurate groups, urea groups or biuret groups ("modified polyisocyanates"). TDI is the most preferred.

Component (ii) of the invention is a compound selected from the group consisting of polyamines containing primary and/or secondary amine groups, hydrazines, hydrazides, and mixtures thereof.

Suitable polyamines useful in the present invention include divalent and/or higher polyvalent, primary and/or secondary, aliphatic, araliphatic, cycloaliphatic or aromatic amines. Specific examples of suitable polyamines include ethylene diamine: 1,2- and 1,3-propylene diamine: tetramethylene diamine: hexamethylene diamine: dodecamethylene diamine; trimethyl diaminohexane, N,N'-dimethyl ethylene diamine: 2,2'-bis-aminopropyl methylamine: higher homologs of ethylene diamine such as diethylene triamine, triethylene tetramine and tetraethylene pentamine: homologs of propylene diamine such as dipropylene triamine; piperazine; N,N'-bis(aminoethyl)piperazine; triazine; 4-aminobenzylamine; 4-aminophenylethylamine; 1-amino-3,3,5-trimethyl-5-aminomethylcyclohexane; 4,4'-diaminodicyclohexylmethane and -propane; 1,4-diaminodicyclohexane; phenylene diamines; naphthylene diamines; condensates of aniline and formaldehyde; tolylene diamines: bis(aminomethyl)benzenes and the derivatives of the above-mentioned aromatic amines which are monoalkylated on one or both nitrogen atoms. Suitable polyamines generally have molecular weights of from about 60 to about 10,000, preferably from 60 to 3000, with the molecular weight range of from 60 to 1000 being particularly preferred.

Suitable hydrazines include hydrazine itself and mono- or N,N'-disubstituted hydrazines, the substituents being, e.g., $C_1$-$C_6$ groups, cyclohexyl groups or phenyl groups. The hydrazines generally have a molecular weight of from 32 to 500. It is generally preferred to use hydrazine itself.

Specific examples of suitable hydrazines useful in the practice of the present invention include hydrazine; methyl hydrazine: ethyl hydrazine; hydrazine hydrate: propyl hydrazine: isopropyl hydrazine; n-butyl hydrazine; isobutyl hydrazine; tert-butyl hydrazine; butenyl hydrazine; dodecyl hydrazine; phenyl hydrazine: tolyl hydrazine: benzyl hydrazine: 2-phenylethyl hydrazine; cyclohexyl hydrazine; cyclopentyl hydrazine; β-cyanoethyl hydrazine, 1,2-dimethyl hydrazine; 1,2-diethyl hydrazine, 1,2-diisobutyl hydrazine; 1-butyl-2-methyl hydrazine; hydrazobenzene: 1-benzyl-2-phenyl hydrazine; oxalyl dihydrazide; semicarbazide; carbohydrazide; 4-methylsemicarbazide; 4-phenylsemicarbazide; isophthalic acid dihydrazide; β-hydrazinopropionic acid hydrazide: thiosemicarbazide; thiocarbohydrazide, aminoguanidine: 1-aminopiperazine and 1,4-diaminopiperazine.

Suitable hydrazides include the hydrazides of divalent or higher polyvalent carboxylic acid, such as carbonic acid, oxalic acid, malonic acid, succinic acid; adipic acid, sebacic acid, azelaic acid, maleic acid, fumaric acid, phthalic acid, isophthalic acid, and terephthalic acid; the esters of hydrazinomonocarboxylic acid with dihydric or higher polyhydric alcohols and phenols, such as ethanediol, 1,2-propane diol, 1,2-butanediol, 1,3-butanediol, 1,4-butanediol, hexanediol, diethyleneglycol, triethylene glycol, tetraethylene glycol, dipropylene glycol, tripropylene glycol and hydroquinone: and the amides of hydrazinomonocarboxylic acid (semicarbazides) with, for example, the above-mentioned diamines and polyamines. These hydrazides generally have molecular weights of from 90 to 10,000, preferably from 90 to 3000 and most preferably from 90 to 1000.

The above-mentioned amines and hydrazines may be used in the form of their standard commercial-grade aqueous solutions.

The present invention makes it possible to use isocyanates and amines, hydrazines, or hydrazides with a functionality of more than two proportionately or exclusively. The reaction of compounds having such relatively high functionality in the presence of hydroxyl-group-containing materials does not result in the formation of solid or very highly viscous reaction products. Rather, such reaction results in the formation of finely divided dispersions.

Also necessary in producing the dispersions of the present invention is the hydroxyl group-containing material (iii).

Polyethers are the preferred hydroxyl group-containing material and preferably contain from 1 to 8, more preferably from 2 to 6, primary and/or secondary hydroxyl groups. The polyethers preferably have molecular weights of from 200 to 16,000 and most preferably from 500 to 12,000. Polyethers of this type may be obtained in known manner by reacting starter compounds containing reactive hydrogen atoms with alkylene oxides, such as ethylene oxide, propylene oxide, butylene oxide, styrene oxide, tetrahydrofuran or epichlorohydrin, or with mixtures of these alkylene oxides. In many cases, it is preferred to use polyethers of the type which contain predominant amounts of primary OH-groups.

Suitable starter compounds for preparing polyethers containing reactive hydrogen atoms include water, methanol, ethanol, ethylene glycol, 1,2- or 1,3-propylene glycol, 1,4- or 2,3-butylene glycol, 1,6-hexanediol, 1,8-octanediol, neopentyl glycol, 1,4-bis(hydroxymethyl)cyclohexane, 2-methyl-1,3-propane diol, glycerol, trimethylolpropane, 1,2,6-hexanetriol, 1,2,4-butanetriol, trimethylolethane, pentaertythritol, mannitol, sorbitol, methylglycoside, cane sugar, phenol, isononylphenol, resorcinol, hydroquinone, 1,2,2- and 1,1,3-tris(hydroxyphenyl)ethane, ammonia, methylamine, ethylene diamine, tetra- or hexamethylene diamine, diethylene triamine, ethanolamine, diethanolamine, triethanolamine, aniline, phenylene diamine, 2,4- and 2,6-diaminotoluene and polyphenyl-polymethylenepolyamines of the type obtained by condensing aniline with formaldehyde. In addition, resin-like materials of the phenol and resol type may also be used as starters. Polyethers modified with vinyl polymers, e.g., the compounds obtained by polymerizing styrene and acrylonitrile in the presence of polyethers (U.S. Pat. Nos. 3,383,151, 3,304,273, 3,523,093 and 3,110,695 and German Patent Specification No. 1,142,536) and polybutadienes which contain OH-groups are also suitable.

Suitable polyesters containing hydroxyl groups which generally have molecular weights of from 400 to 16,000, and preferably from 500 to 12,000, include reaction products of polyhydric (preferably dihydric and, optionally, trihydric) alcohols with polybasic (preferably dibasic) carboxylic acids. Instead of using free polycarboxylic acids, it is also possible to use the corresponding polycarboxylic acid esters of lower alcohols or mixtures thereof for producing the polyesters. The polycarboxylic acids may be aliphatic, cycloaliphatic, aromatic and/or heterocyclic and may be substituted (for example by halogen atoms) and/or unsaturated. Examples of suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bis-glycol ester. Examples of suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexane dimethanol (1,4-bis(hydroxymethyl) cyclohexane), 2-methyl-1,3-propanediol, glycerol, trimethylol propane, 1,2,6-hexanetriol, 1,2,4-butane triol, trimethylol ethane, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones, such as ε-caprolactam, or hydroxy carboxylic acids, such as ω-hydroxy caproic acid, may also be used.

Suitable polycarbonates containing hydroxyl groups may be obtained, for example, by reacting diols, such as 1,3-propanediol, 1,4-butanediol and/or 1,6-hexanediol, diethylene glycol, triethylene glycol or tetraethylene glycol, with diaryl carbonates, such as diphenyl carbonate, or with phosgene.

Suitable polyester amides include the predominantly linear condensates obtained from polybasic saturated and unsaturated carboxylic acids or their anhydrides and polyhydric saturated and unsaturated amino alcohols, diamines, polyamines and mixtures thereof.

The molecular weight ranges for both the polycarbonates and polyester amides are generally from 400 to 16,000 and preferably from 500 to 12,000.

Although in the reaction of the isocyanate (i) and the component (ii) in the presence of the hydroxyl-group-containing material, the NCO-groups react preferentially with the NH- and/or NH2-groups, the OH-groups also play their part in the reaction. This reaction results in the formation of polyurea and/or polyhydrazodicarbonamide chains which are chemically attached to molecules of the hydroxyl-containing material. Molecules of this type presumably have a dispersing effect upon the resinous particles. The extent to which the OH-group takes part in the reaction is governed by the course of the reaction. If too many hydroxyl functional molecules react with the isocyanate, highly viscous dispersions are obtained. If, on the other hand, the proportion of co-reacting hydroxyl functional molecules is too small, the dispersions formed may be unstable. By following the process of the present invention, it is possible to control the NCO/OH-reaction to such a degree that finely divided dispersions with the low viscosity required are formed. Additionally, the dispersions are so stable that they do not sediment even after prolonged storage and even after storage at elevated temperatures.

The polyaddition products dispersed in the hydroxyl-group-containing material obtained by the process of the present invention may also be modified by using monofunctional isocyanates, amines, hydrazine derivatives or ammonia. For example, the average molecular weight of the polyaddition products may be adjusted by incorporating monofunctional compounds of this type. Where alkanolamines with primary or secondary amino groups are used, it is possible to synthesize polyureas and polyurea polyhydrazodicarbonamides containing free hydroxyl groups. It is also possible to introduce other groups, such as ester groups, relatively long aliphatic radicals, tertiary amino groups and active double bonds by including correspondingly substituted monoamines or diamines and/or isocyanates in the reaction environment. These monofunctional compounds may generally be used in an amount of up to 40 mol % and more preferably in amounts of up to 25 mol % (based on total isocyanate, amine, hydrazine and hydrazide content).

Suitable monofunctional isocyanates include alkyl isocyanates, such as methyl, ethyl, isopropyl, isobutyl, hexyl, lauryl and stearyl isocyanate; chlorohexyl isocyanate: cyclohexyl isocyanate; phenyl isocyanate: tolyl isocyanate: 4-chlorophenyl isocyanate; and diisopropylphenyl isocyanate.

Examples of suitable monoamines include: alkyl and dialkyl amines with $C_1$-$C_8$ alkyl groups; cycloaliphatic amines, such as cyclohexylamine and homologs thereof; aniline and N-alkyl anilines; aniline derivatives substituted on the benzene nucleus; alkanolamines, such as ethanolamine, diethanolamine, propanolamine, dioropanolamine, butanolamine and dibutanolamine; and diamines with one tertiary and one primary or secondary amino group, such as N,N-dimethyl ethylene diamine and N-methylpiperazine. Monofunctional hydrazine derivatives and hydrazides of monocarboxylic acids, hydrazine monocarboxylic acid esters of monofunctional alcohols or phenols, and semicarbazides, such as methyl, ethyl, propyl, butyl, hexyl, dodecyl, stearyl, phenyl and cyclohexyl semicarbazide may also be used.

It is also possible to include relatively low molecular weight glycols and polyols having molecular weights up to 400 in the reaction environment. Suitable low molecular weight polyols include the diols and triols known to those skilled in the polyurethane chemistry as chain extenders and crosslinkers. Examples of such glycols and polyols are 1,2- and 1,3-propylene glycol, 1,4- and 2,3-butylene glycol, 1,6-hexanediol, 1,8-octanediol, neopentyl glycol, cyclohexane dimethanol, 1-methyl-1,3-propanediol, glycerol, trimethylol propane, 1,2,6-hexanetriol, 1,2,4-butane triol or trimethylol ethane. Clycols with hydrophilic character, such as ethylene glycol, diethylene glycol, triethylene glycol and dipropylene glycol are preferred. It is also possible to use compounds such as dibutylene glycol, thiodiglycol and castor oil. Ester diols corresponding to one of the following general formulas are also useful:

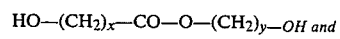
$HO-(CH_2)_x-CO-O-(CH_2)_y-OH$ and

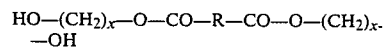
$HO-(CH_2)_x-O-CO-R-CO-O-(CH_2)_x-OH$ in which

R represents an alkylene or arylene radical having from 1 to 10 carbon atoms and preferably having from 2 to 6 carbon atoms, x is an integer of from 2 to 6 and y is an integer from 2 to 5.

Specific examples of such ester diols include δ-hydroxybutyl- ε-hydroxycaproic acid ester, ω-hydroxyhexyl-γ-hydroxybutyric acid ester, adipic acid bis(β-hydroxyethyl) ester and terephthalic acid bis(β-hydroxyethyl) ester.

Diol urethanes corresponding to the following general formula are also useful:

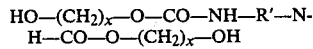

in which

R' represents an alkylene, cycloalkylene or arylene radical having from 2 to 15 carbon atoms, preferably from 2 to 6 carbon atoms, and is an integer of from 2 to 6.

Examples of such diol urethanes include 1,6-hexamethylene-bis(β-hydroxyethyl urethane) and 4,4'-diphenylmethane-bis(β-hydroxybutyl urethane).

Even diol ureas corresponding to the general formula are useful:

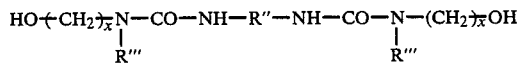

in which

R" represents an alkylene, cycloalkylene or arylene radical having from 2 to 15 carbon atoms, preferably from 2 to 9 carbon atoms, R''' represents H or $CH_3$ and x is 2 or 3.

Examples of such diol ureas include 4,4'-diphenylmethane-bis (β-hydroxyethyl urea) and the compound

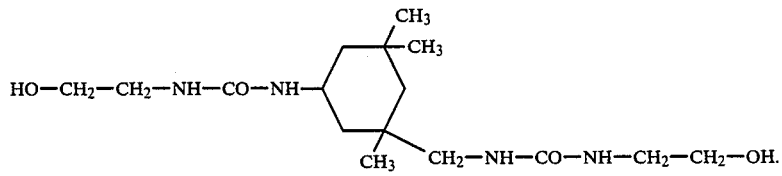

Particularly suitable low molecular weight dihydric and trihydric alcohols are those which, in admixture with the relatively high molecular weight polyethers, give a dispersant (component (iii) in the process of the present invention) which is liquid below 50° C.

The key to the present invention resides in conducting the reaction of components (i), (ii) and (iii) in the presence of a compound which is capable of stabilizing the dispersions. As mentioned above, it has now surprisingly been found that suitable dispersion stabilizing compounds include compounds that are also capable of catalyzing the reaction between isocyanate groups and amines or water. Compounds capable of catalyzing such reactions are known in the art and are described for example in *Polyurethanes: Chemistry and Technology*, Vol. I, Saunders and Frisch, 1962, pages 134–173 and 208–212. Tertiary amines have been found to be particularly useful dispersion stabilizing compounds.

Suitable tertiary amines according to this invention include N-methylmorpholine; N-ethylmorpholine; triethylamine; N-methyldiethanolamine; N,N-diethyl- and -dimethylaminoethanol: triethanolamine; tetramethylguanidine; N,N,N',N'-tetramethylenediamine; N,N-dimethyl($C_{10}$-$C_{16}$ alkyl)amines: N,N-dimethylcyclohexylamine; N,N-dimethylpiperazine; 1,2,4-trimethylpiperazine; bis(2-hydroxypropyl)-2-methylpiperazine; bis(β-dimethylaminoethyl) ether; tributylamine; N-cocomorpholine; N-methyl-N'-(dimethylaminoethyl)piperazine; N,N-dimethylbenzylamine; bis(N,N-diethylaminoethyl) adipate; N,N-diethylbenzylamine; pentamethyldiethylenetriamine; N,N-bis(N',N'-dimethylaminopropyl)methylamine; N,N,N',N'-tetramethyl-1,3-butanediamine; N,N-dimethyl-β-phenylethylamine; 1,2-dimethylimidazole; 2-methylimidazole; pyridine and the like. Particularly preferred tertiary amines include bis(β-dimethylaminoethyl)ether, N,N-dimethylcyclohexylamine, and N,N-bis(N',N'-dimethylaminopropyl)methylamine.

The amount of dispersion stabilizing compound used can vary over a wide range. At least 10 parts per million parts by weight, preferably at least 50 and more preferably from 100 to 500 parts per million parts by weight, of the total weight of components (i), (ii) and (iii) should be used. The upper limit is governed by economics and is generally no higher than 1000 parts per million.

The viscosity of the reaction mixture in the through-flow mixers at the reaction temperature is generally below 2000 cP, preferably below 1000 cP and most preferably in the range of from 100 to 500 cP.

The molecular weight of the products formed in dispersion in hydroxyl-containing material (iii) is determined by the quantitative ratio between polyamine, hydrazine or hydrazide and any monofunctional compounds used. It is particularly preferred to react substantially equivalent quantities of isocyanates and NH-functional compounds in the hydroxyl-group-containing material. However, it is also possible to use an excess of isocyanate. In general, an NCO:NH ratio of from 0.80 to 1.35, more preferably from 0.90 to 1.05, is maintained.

The concentration of the polyaddition products in the hydroxyl-group-containing material may vary within wide limits, although it is generally from 1 to 45% by weight, more preferably from 20 to 30% by weight.

In general, the reaction components are introduced into a flow mixer of the type generally known in the art at room temperature. If desired, the hydroxyl containing material may be introduced at a slightly elevated temperature (for example 40° to 50° C.) to reduce the viscosity for ease of pumping and more efficient mixing. The reaction temperature may rise to from 50° to 150° C. under the effect of the shear forces generated in cases where a dynamic mixer is used and under the effect of the heat generated by the polyaddition reaction depending upon the quantity of resinous solids). In general, however, it is best to keep the temperature below 110° C. (optionally by cooling the mixer) because at higher temperatures any water which may be present evaporates and can give rise to disturbances as a result of bubble formation. Where hydrazine is used, it is important to ensure that the decomposition temperature of hydrazine is not exceeded.

The polyaddition reaction of polyisocyanates with polyamines, hydrazines and/or hydrazides can be carried out in higher-performance continuous flow mixers with average residence times of from about 1 second up to 10 minutes, preferably from 2 seconds to 3 minutes.

The homogenization or dispersion time should not exceed 10% of the average residence time if thorough admixture of the components is to be obtained. It is possible, although not essential, to arrange two or even more flow mixers one behind the other. The times given above then apply to the mixer system as a whole.

Flow mixers are known and divided into two groups, namely static mixers with fixed fittings and dynamic mixers with movable fittings operating on the rotor-stator principle. They may optionally be heated or cooled. In the case of static mixers, the mixing energy required is applied through pumps, whereas in the case of dynamic mixers a separate motor drives the rotor.

In every case, the dispersing effect and the particle size in the dispersion is governed by the energy applied, the shear forces correspondingly generated, and the catalysts present.

Static mixers may be divided into the following types: (a) mixers with simple fittings (see e.g., U.S. Pat. No. 3,286,992, German Offenlegungsschrif No. 2,119,293 and U.S. Pat. No. 3,704,006); (b) multi-channel mixers (for example, the AMK-Ross-ISG Mixers manufactured by Aachener Misch-und Knetmaschinen-Fabrik, West Germany); (c) so-called packing mixers, for example, the static mixers manufactured by Sulzer AG (Winterthur, Switzerland) and the BKM-Mixers manufactured by Bayer AG (West Germany) (See e.g., U.S. Pat. No. 3,785,620 and German Offenlegungsschrift No. 2,328,795 which corresponds to U.S. patent Ser. No. 474,836): and (d) mixing nozzles, for example, those manufactured by the Lechler Company (Stuttgart, West Germany) and the mixing chambers in the HK-machines manufactured by the Hennecke Company (Birlinghoven, West Germany) into which the starting products are injected under high pressure (countercurrent injection).

Dynamic mixers suitable for use in the process of the present invention include the flow mixers manufactured by the companies Ekato RMT (Schopfheim, West Germany), Lightnin (Neu-Isenburg, West Germany) and Hennecke (toothed stirrer) which, like the known impeller-type homogenizing machines, operate on the stator-rotor principle but cannot be used to perform feed or delivery functions.

The energy required to produce the dispersions of the present invention is generally from 1 to more than 10 kW per liter of mixer volume The amount of energy is however dependent upon the required particle size, the type of mixer used, and the viscosity of the starting materials.

Where anhydrous amines, hydrazines and/or hydrazides are used, there is no need for any further treatment of the dispersion on completion of the polyaddition reactions. However, where aqueous amines are used (for example, aqueous ethylene diamine solution or hydrazine hydrate) are used, it may be advisable to remove the water from the dispersion in vacuo.

In general, the process of the present invention is carried out by introducing the four components (i.e. hydroxyl-group-containing material, NH-component, isocyanate, and dispersion stabilizing compounds) from separate supply vessels through metering pumps into the flow mixer in which they are thoroughly mixed and in which, at the same time, most of the polyaddition reaction takes place. However, it is also possible to combine the amine component, the hydroxyl-group-containing component and dispersion stabilizing compound before introduction into the flow mixer. In cases where aqueous amines are used, the end products may be freed in vacuo from the water present in them.

The dispersions prepared by the process according to the invention may be processed into soft, semi-hard and hard polyurethane foams with improved properties, such as increased tensile strength and elongation. These dispersions are also suitable for the production of elastomers, coverings and coatings based on polyurethanes. Polyurethane products from the dispersions can be made in substantially any manner known in the art.

The polyurethane-forming reaction components (i.e., the dispersions of the present invention, isocyanate, and any other materials such as catalysts, blowing agents, and the like.) may be reacted by the known one-stage process, by the prepolymer process or by the semi-prepolymer process. Machines such as those described in U.S. Pat. No. 2,764,565 may be used in many of these processes. Particulars of the processing machines which may also be used to produce polyurethanes in accordance with the invention may be found in *Kunststoff-Handbuch*, Vol. VII, Vieweg and Hochtlen, Carl-Hanser-Verlag, Munich 1966, pages 121 to 205.

Foams produced from the dispersions of the present invention may be produced by introducing the reaction mixture into a mold. Suitable mold materials include metals (for example, aluminum) or plastics (for example, epoxide resin). In the mold, the foamable reaction mixture foams and forms the molding. In-mold foaming may be carried out in such a way that the molding has a compact skin and a cellular core. It is possible to introduce into the mold a quantity of foamable reaction mixture such that the foam formed just fills the mold. It is also possible to introduce into the mold more foamable reaction mixture than is required to fill the interior of the mold with foam. This latter technique is known as "over-charging" and is described, for example, in U.S. Pat. Nos. 3,178,490 and 3,182,104.

In many cases "external release agents" such as silicone oils, are used during in-mold foaming. However, it is also possible to use so-called "internal release agents", optionally in admixture with external release agents, as known, for example, from German Offenlegungsschrif Nos. 2,121,670 and 2,307,589.

Cold-hardening foams may also be produced in accordance with the invention. See British Pat. No. 1,162,517 and German Offenlegungsschrift No. 2,153,086.

It is further possible to produce foams by block foaming or by the known double conveyor belt process.

The foams produced using the dispersions of the present invention may be used, for example, as upholstery materials, mattresses, packaging materials, shock-absorbing motor-vehicle components, films for laminating purposes and as insulating materials. The highly flexible foams produced by the process according to the invention are particularly suitable for flame lamination with films, woven fabrics and knitted fabrics of natural and synthetic materials. Films of these foams may also be effectively welded by high-frequency and ultrasonic welding. The hard polyurethane foams produced are also suitable for the production of articles with an integral structure or for the production of sandwich elements. The foams may either be produced by the in-mold foaming process or may be obtained by fabrication from block-foamed materials. They may be processed by deep-drawing, stamping or hot-forming.

The invention is further illustrated, but is not intended to be limited by the following examples in which all parts and percentages are by weight unless otherwise specified.

EXAMPLES

The polyether polyol used in each of the following Examples 1–11 was a glycerin-started polyether of propylene oxide and ethylene oxide with an OH number of 35 and a primary OH group content of approximately 80% based on the total OH content of the polyether.

The isocyanate used in each of the following examples was tolylene diisoyanate containing 8% 2,4-isomer and 20% 2,6-isomer.

EXAMPLE 1

36.3 g of bis($\beta$-dimethylaminoethyl) ether were added with stirring to 800 pounds of the polyether polyol in a 300 gallon vessel (100 ppm tertiary amine based on polyether).

2682 g/min of this polyether-tertiary amine mixture and 227 g/min of hydrazine hydrate (64% hydrazine) were separately pumped into a first static mixer (diameter=12.5 mm: length=155 mm; number of elements=6). At the same time, 1054 g/min of the polyether-catalyst mixture and 789 g/min of isocyanate were separately pumped into a second static mixer identical to the first static mixer. The mixtures formed in the two static mixers were then brought together at 135° C. in a toothed stirrer (chamber volume =500 ml; 5000 rpm). The dispersion formed in this stirrer was delivered to a post reactor where it was stirred for 30 min. at 80°–100° C. and subsequently dewatered in vacuo. A stable, white finely divided dispersion having a Brookfield viscosity of 3730 cPs at 25° C. was obtained.

To a sample of the dispersion was added 6.2 parts by weight of water per 100 parts by weight of dispersion. After the dispersion was aged for 4 days, the viscosity of the dispersion was 6000 cPs.

EXAMPLES 2-7

The procedure and materials used in Examples 2-6 were the same as those used in Example 1, except for using different tertiary amines. The procedure and materials used in Example 7 were the same as those used in Example 1, except for using stannous octanoate instead of the tertiary amine. The relative quantities of the reactants and the viscosities of the resultant dispersions are given in Table 1.

TABLE 1

| Example No. | Total Feed Rate (g/min) | | | Mixer Temp (°C.) | Additional Reagents[1] | Additional Reagent Conc(ppm) | Viscosity (cPs @ 25° C.) | |
|---|---|---|---|---|---|---|---|---|
| | Isocyanate | Polyether Polyol | Hydrazine Hydrate | | | | Initial | Aged 4 days (6.2 parts water) |
| 2 | 834 | 3944 | 243 | 136 | — | — | 4080 | 44,400 |
| 3 | 827 | 3980 | 239 | 136 | A | 500 | 3200 | 6,680 |
| 4 | 836 | 4032 | 239 | 135 | B | 500 | 4720 | 37,610 |
| 5 | 853 | 4000 | 243 | 132 | C | 500 | 3680 | 4,880 |
| 6 | 853 | 4000 | 243 | 134 | D | 500 | 4400 | 4,920 |
| 7 | 853 | 4000 | 243 | 130 | E | 700 | 4380 | 54,010 |

(1)Additional reagents include tertiary amines of the invention and comparison compounds:
A: Bis($\beta$-dimethylaminoethyl) ether.
B: Triethylenediamine for purposes of comparison.
C: N,N—Dimethylcyclohexylamine.
D: N,N—Bis(N′,N′—dimethylaminopropyl)methylamine.
E: Stannous octanoate for puposes of comparison.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of stable dispersions of polyureas and/or polyhydrazodicarbonamides in a hydroxyl-group-containing material comprising reacting
   (i) an organic di- and/or polyisocyanate with
   (ii) a composition selected from the group consisting of polyamines containing primary and/or secondary amine groups, hydrazines, hydrazides, and mixtures thereof, in
   (iii) said hydroxyl-group-containing material selected from the group consisting of polyethers, polyesters, polyesteramides, polycarbonates and mixtures thereof,
   in the presence of
   (iv) a dispersion stabilizing compound, wherein at least 50 parts by weight of said dispersion stabilizing compound is used for every million parts by weight of the combined weight of components (i), (ii) and (iii).

2. A process according to claim 1 wherein isocyanate (i) is one or more isomers of tolylene diisocyanate.

3. A process according to claim 1 wherein composition (ii) is a hydrazine.

4. A process according to claim 1 wherein the hydroxyl-group-containing material (iii) is a polyether 5. A process according to claim 1 wherein the dispersion stabilizing compound (iv) is a tertiary amine.

6. A process according to claim 5 wherein the tertiary amine is selected from the group consisting of bis ($\beta$-dimethylaminoethyl) ether, N,N-dimethylcyclohexylamine, and N,N-bis(N′,N′-dimethylaminopropyl)methylamine.

7. A process according to claim 1 for the production of stable dispersions of polyureas and/or polyhydrazodicarbonamides in a hydroxyl-group-containing material comprising reacting
   (i) one or more isomers of tolylene diisocyanate with
   (ii) a hydrazine in
   (iii) a polyether polyol,
   in the presence of (iv) a dispersion stabilizing compound selected from the group consisting of bis($\beta$-dimethylaminoethyl) ether, N,N-dimethylcyclohexylamine, and N,N-bis(N',N'-dimethylaminopropyl)methylamine, wherein at least 50 parts by weight of said dispersion stabilizing compound is used for every million parts by weight of the combined weight of components (i), (ii) and (iii).

8. The dispersion prepared by the process of claim 1.
9. The dispersion prepared by the process of claim 7.

* * * * *